United States Patent [19]

Seon et al.

[11] Patent Number: 4,913,885
[45] Date of Patent: Apr. 3, 1990

[54] RECOVERY OF VANADIUM VALUES

[75] Inventors: Francoise Seon, Montreuil; Michel Ries, Vitry/sur/Seine, both of France

[73] Assignee: Rhone-Poulenc Chimie, Courbevoie, France

[21] Appl. No.: 186,947

[22] Filed: Apr. 27, 1988

[30] Foreign Application Priority Data

Apr. 29, 1987 [FR] France .................................. 87 06089

[51] Int. Cl.$^4$ .............................................. C01G 31/00
[52] U.S. Cl. ......................................... 423/67; 423/68; 423/544; 423/593; 502/24
[58] Field of Search ............... 75/101 R, 121; 423/68, 423/67, 544, 593; 502/22, 24, 27

[56] References Cited

U.S. PATENT DOCUMENTS

| 3,305,322 | 2/1967 | Henrickson | 502/24 |
| 3,840,637 | 10/1974 | Hardwick et al. | 423/68 |
| 4,243,550 | 1/1981 | Burk et al. | 502/24 |
| 4,432,953 | 2/1984 | Hubred et al. | 423/68 |

Primary Examiner—Robert L. Stoll
Attorney, Agent, or Firm—Burns, Doane, Swecker & Mathis

[57] ABSTRACT

Vanadium values useful for catalyst regeneration are recovered from compositions/materials comprised thereof, typically spent $V_2O_5$ catalysts, by intimately contacting an aqueous suspension of such a material with a gaseous admixture of sulfur dioxide and oxygen, whereby a phase separation thus results, and recovering an aqueous phase constituting a solution of vanadium values.

14 Claims, No Drawings

RECOVERY OF VANADIUM VALUES

BACKGROUND OF THE INVENTION

1. Field of the Invention:

The present invention relates to the recovery of vanadium values from compositions/materials comprised thereof, and, more especially, to the recovery of vanadium values contained in used or spent catalysts.

2. Description of the Prior Art:

It is known to this art that vanadium, in particular in the form of vanadium pentoxide $V_2O_5$, is presently widely used as a catalyst in numerous chemical processes, for example in the oxidation of sulfur dioxide to sulfur trioxide in the production of sulfuric acid, or in the reduction of the nitrogen oxides contained in residual gases, in the presence of ammonia.

In all of these cases, it is observed, after a more or less extensive period of use, that there is a very marked reduction in the catalytic activity of the catalysts, generally related to chemical and/or mechanical aging phenomena. In the particular case of the production of sulfuric acid, for example, a progressive poisoning of the catalyst is determined due to the partial or total conversion of the vanadium pentoxide.

For this reason, in order to maintain the production rate, it is necessary to replace the used catalysts with fresh material.

In light of the high cost of vanadium on the one hand, the advantage provided by a treatment of residual catalyst material to recover the catalytic elements is readily apparent.

On the other hand, environmental constraints mandate that the residual vanadium values of spent material to be discharged to waste do not exceed 5 g vanadium/kg. Therefore, this presupposes a process providing recovery yields that are compatible with such constraints.

In Czechoslovak Patent No. 178,626, filed June 16, 1975, a process is described for the recovery of vanadium values from residual catalysts based on the leaching, by percolation of the catalytic material with water, in the presence of pure sulfur dioxide. The $SO_2$ serves as the reducing agent for the vanadium pentoxide contained in the catalyst. On the one hand, a solid filter cake (catalyst support material) is produced, as well as, on the other, a clear vanadyl sulfate filtrate.

However, such a process has the disadvantage of requiring pure sulfur dioxide gas, which is expensive. Thus, such a process is uneconomical for applications on an industrial scale. The '626 patent is conspicuously silent as regards alternate gaseous compounds that may be suitable for use in the process.

SUMMARY OF THE INVENTION

Accordingly, a major object of the present invention is the provision of an improved process for the recovery of vanadium values from compositions/materials diminished in vanadium activity, in high yields, which improved process is both simple and particularly economical for industrial applications.

Briefly, the present invention features the recovery of vanadium values from compositions/materials comprised thereof, by contacting an aqueous suspension of such composition/material with a gaseous admixture of sulfur dioxide and oxygen, whereby, after phase separation, an aqueous solution of vanadium values results which constitutes the desired final product.

DETAILED DESCRIPTION OF THE PREFERRED EMBODIMENTS OF THE INVENTION

More particularly according to the present invention, it has now surprisingly and unexpectedly been determined that even in admixture with an oxidant such as oxygen, sulfur dioxide is well suited for the reduction of vanadium, and also that, even when diluted in mixtures in which the proportion of $SO_2$ may be very low, the kinetics of the reaction between the vanadium and the sulfur dioxide are maintained.

Thus, one advantage of the invention is that it provides for the recovery of vanadium values, in particular from spent catalysts, by leaching with industrial grade sulfur dioxide, for example, exhaust gases from industrial combustion processes having low $SO_2$ contents, such as resulting, specifically, in sulfuric acid production plants.

Hence, this invention is applicable to any composition/material containing vanadium values, at least a portion of which are in the +5 oxidation state, in particular in the form of $V_2O_5$.

Exemplary of such compositions/materials are catalysts used in the production of sulfuric acid, or those employed for the reduction of nitrogen oxides in the presence of ammonia. Such catalysts are present in the form of monoliths or extrudates (spheres, pellets) typically comprising a refractory support (silica, alumina, mullite, cordierite, titanium dioxide, and the like, individually or in admixture) and an active phase which is impregnated onto said support, or incorporated directly into the mass by cokneading.

The active phase, in addition to the vanadium which is generally present in the form of $V_2O_5$, may also contain other catalytic elements, such as, for example, molybdenum, tungsten, nickel, cobalt, copper, chromium, iron, aluminum, and the like.

Thus, a conventional sulfuric catalyst may contain vanadium, potassium and sulfate ions, the entirety of which being supported on macroporous silica, with the contents of these elements being capable of variation during the transformation of the catalyst into a spent catalyst.

Prior to the leaching, it may be advantageous to initially grind the spent material such as to provide particles of a size on the order of millimeters, preferably ranging from 0.05 to 0.5 mm.

The material ground in this manner is then suspended in water, in an agitated reactor. The ratio of the weight of the ground material to water is not critical. It is advantageous to increase this ratio in order to provide, after the treatment, a more highly concentrated vanadium solution. However, the upper limit of this ratio is dictated by the consistency of the resulting suspension, at which agitation becomes difficult.

This suspension is then intimately contacted with a gaseous flowstream of $SO_2$ and oxygen. Such mixture may itself be diluted with an inert gas, for example nitrogen. As explained above, one advantage of the invention is in the fact that such type of mixture may be a conventional exhaust gas from an industrial combustion process. This makes it possible to considerably reduce the cost of the recovery of vanadium values, thereby providing a recovery process that is viable on an industrial scale.

For example, the combustion exhaust gases recovered in sulfuric acid production plants are particularly suitable for use in the process according to the invention. The composition of these gases (percentage by weight) is typically as follows:

$5\% < SO_2 < 20\%$ $10\% < O_2 < 30\%$ with the remainder constituting an inert gas, such as nitrogen.

It will of course be appreciated that these ranges are given as exemplary only, as the invention is not limited by the origin or manner of obtaining the $SO_2 + O_2$ mixtures.

The amount of $SO_2$ bubbled into the aqueous suspension should at least correspond to the stoichiometric amount relative to the quantity of the vanadium $+5$ to be extracted.

The operation is carried out at a temperature ranging from ambient to 90° C. However, for reasons of economy it is preferred to carry out the process at ambient temperature.

Agitation is maintained after the introduction of the $SO_2$ for a period of time of from 15 min to 4 hr, such as to effect the dissolution of vanadium and/or other compounds, such as alkaline sulfates.

Subsequently, after the separation of the resulting phases, in particular by filtration, on the one hand a mother liquor of vanadyl sulfate is produced, and on the other a residual filter cake principally comprising the support material of the spent catalyst.

In a preferred embodiment of the invention, said residual filter cake is then washed by resuspension in water.

The waters from this first washing are collected by filtration. A second and, if necessary, a third washing are carried out under similar conditions.

The wash waters may then be introduced into the mother liquor, or else recycled by using them as wash solutions in later operations.

To obtain high yields of vanadium recovery, specifically higher than 90%, it is necessary to employ several wash stages, in view of the fact that considerable impregnation of the residual cake by the mother liquor occurs. Successive washings make it possible to enhance the recovery by diluting the impregnating solution, and to obtain cakes in which the residual vanadium content is less than 2 g V/kg.

The vanadyl sulfate solution obtained upon completion of the process of the invention thus constitutes a source of vanadium, from which such values may be recovered by any known means, in particular by the re-oxidation of vanadium $+4$ to vanadium $+5$ by means of a chemical oxidant (manganese dioxide, sodium chlorate, etc.), followed by precipitation in the form of ammonium metavanadate by the addition of ammonia. The ammonium metavanadate is filtered, washed, dried and then calcined, to give pure vanadium pentoxide, which may then be reused in the production of new catalysts.

In order to further illustrate the present invention and the advantages thereof, the following specific examples are given, it being understood that same are intended only as illustrative and in nowise limitative:

(A) COMPARATIVE EXAMPLES

These examples illustrate the process for the recovery of vanadium described in Czechoslovak Patent No. 178,626.

The initial catalyst was a spent catalyst that was employed in the oxidation of $SO_2$ to $SO_3$ in the production of sulfuric acid.

Its composition, unless indicated otherwise, was the following (% by weight relative to the total weight of the catalyst):
$V_2O_5$: 7.5%
$K_2O$ : 11.7%
$SO_4$ : 25.8%
Na : 1.2%
Al : 0.15%
Fe : 0.015%
Support : $SiO_2$

COMPARATIVE EXAMPLE 1

300 g of the ground catalyst were suspended in 450 g water. The catalyst was leached at ambient temperature, while pure $SO_2$ was bubbled therethrough for 1 hr and under agitation of 500 rpm. The mixture was then maintained under agitation for 4 hr. The molar ratio $SO_2/V_2O_5$ was 1.5. The suspension was removed and filtered. A mother liquor of vanadyl sulfate was obtained; it contained 41 g/l vanadium expressed as $V_2O_5$. The residual filter cake was placed in suspension. After two washings with 450 g water of the residual cake, the total yield of recovery was 96%.

COMPARATIVE EXAMPLE 2

500 g of the ground catalyst were suspended in 375 g water and leached by bubbling pure $SO_2$ therethrough for 1 hr, under agitation at 500 rpm. Leaching was carried out at ambient temperature. The mixture was then maintained for 4 hr under agitation. The molar ratio $SO_2/V_2O_5$ was 1.5. Following the recovery of a mother liquor of vanadyl sulfate containing 69.5 g/l vanadium, expressed as $V_2O_5$, and 3 washes of the residual cake with 375 g water, the total yield of vanadium recovery was 96%.

COMPARATIVE EXAMPLE 3

500 g of the ground catalyst were suspended in 375 g water and leached by bubbling pure $SO_2$ therethrough for 1 hr, under agitation at 500 rpm. Leaching was carried out at ambient temperature. Subsequently, the mixture was maintained for 4 hr under agitation. The molar ratio $SO_2/V_2O_5$ was 1.0. The suspension was withdrawn and filtered. A mother liquor of vanadyl sulfate containing 65 g/l vanadium, expressed as $V_2O_5$, was obtained. The residual cake was washed 3 times. This washing was carried out by resuspending the cake in 375 g water. After 3 washes, the total yield of vanadium recovery was 95%.

(B) EXAMPLES ACCORDING TO THE INVENTION

The initial catalyst was the same as in the comparative examples, unless otherwise indicated.

EXAMPLE 4

500 g of the ground catalyst were suspended in 375 g water and leached by bubbling therethrough a gas comprising a mixture (percentage by weight) of $SO_2$: 17%, $O_2$: 17% and $N_2$: 66%, for 1 hr under agitation at 500 rpm. Leaching was carried out at ambient temperature. The mixture was then maintained for 4 hr under agitation. The molar ratio $SO_2/V_2O_5$ was 1.0.

The suspension was withdrawn and filtered. A mother liquor of vanadyl sulfate containing 62 g/l vanadium, expressed as $V_2O_5$, was obtained. The residual cake was washed 3 times with 375 g water. After 3 washes of the cake, the total yield of vanadium recovery was 95%.

EXAMPLE 5

500 g of the ground catalyst were suspended in 375 g and leached by bubbling therethrough a gas comprising a mixture (percentage by weight) of $SO_2$: 9%, $O_2$: 18% and $N_2$: 73%, for 1 hr under agitation at 500 rpm. Leaching was carried out at ambient temperature. The mixture was then maintained for 4 hr under agitation. The molar ratio $SO_2/V_2O_5$ was 1.0. The suspension was withdrawn and filtered. A mother liquor of vanadyl sulfate containing 60 g/l vanadium, expressed as $V_2O_5$, was obtained. The residual cake was washed 3 times with 375 g water. After 3 washes of the cake, the total yield of vanadium recovery was 94%.

EXAMPLE 6

250 g of the ground catalyst (6.5% $V_2O5$) were suspended in 190 g water and leached by bubbling therethrough a gas comprising a mixture of (% by weight) $SO_2$: 6%, $O_2$: 19%, $N_2$: 75% for 1 hr under agitation at 500 rpm. Leaching was carried out at ambient temperature. The mixture was then maintained for 4 hr under agitation. The molar ratio $SO_2/V_2O_5$ was 1.0. The suspension was then withdrawn and filtered. A mother liquor of vanadyl sulfate containing 35 g/l vanadium, expressed as $V_2O_5$, was obtained. The residual cake was washed 3 times with 190 g water. After 3 washes of the cake, the total yield of vanadium recovery was 50%.

These examples and more particularly Examples 4 and 5 clearly demonstrate the viability of the process of the invention for the recovery of vanadium utilizing $SO_2$ diluted admixtures, the latter advantageously being common industrial effluents, for example those encountered in sulfuric acid production plants.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the recovery of vanadium values from a material comprised thereof, comprising intimately contacting an aqueous suspension of such material with a gaseous admixture of sulfur dioxide and oxygen, whereby a phase separation thus results, and recovering an aqueous phase which comprises a solution of vanadium values said gaseous admixture comprising a stoichiometric vanadium reducing amount of $SO_2$.

2. The process as defined by claim 1, said gaseous admixture further comprising an inert gas.

3. The process as defined by claim 2, said inert gas comprising nitrogen.

4. The process as defined by claim 1, said gaseous admixture comprising from 5% to 20% of $SO_2$ and from 10% to 30% of $O_2$.

5. The process as defined by claim 1, said gaseous admixture comprising an effluent gas produced in the oxidation of $SO_2$ to $SO_3$.

6. The process as defined by claim 1, said material containing the vanadium values comprising a supported vanadium pentoxide catalyst.

7. The process as defined by claim 6, wherein the catalyst support comprises a refractory material.

8. The process as defined by claim 7, said refractory material comprising silica, alumina, mullite, cordierite or titanium dioxide.

9. The process as defined by claim 7, wherein the catalyst comprises a monolith or an extrudate.

10. The process as defined by claim 1, wherein said material containing the vanadium values is ground to a particle size of from 0.05 mm to 0.5 mm.

11. The process as defined by claim 1, carried out at a temperature of from 18° to 25° C.

12. The process as defined by claim 1, comprising washing the residual cake which results after phase separation.

13. The process as defined by claim 12, comprising adding the wash waters to the recovered aqueous solution of vanadium values.

14. The process as defined by claim 1, comprising oxidizing the vanadium values in said aqueous phase to an oxidation state of +5, precipitating said +5 vanadium values, and then calcining the resulting precipitate into a purified vanadium pentoxide.

* * * * *